July 28, 1931.  T. HELD  1,816,325
FRICTION SPRING
Filed Feb. 20, 1930
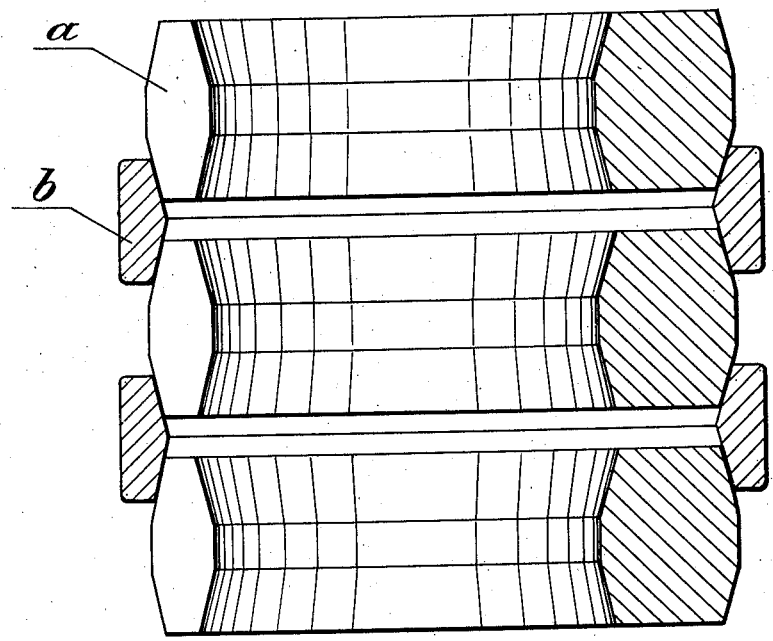
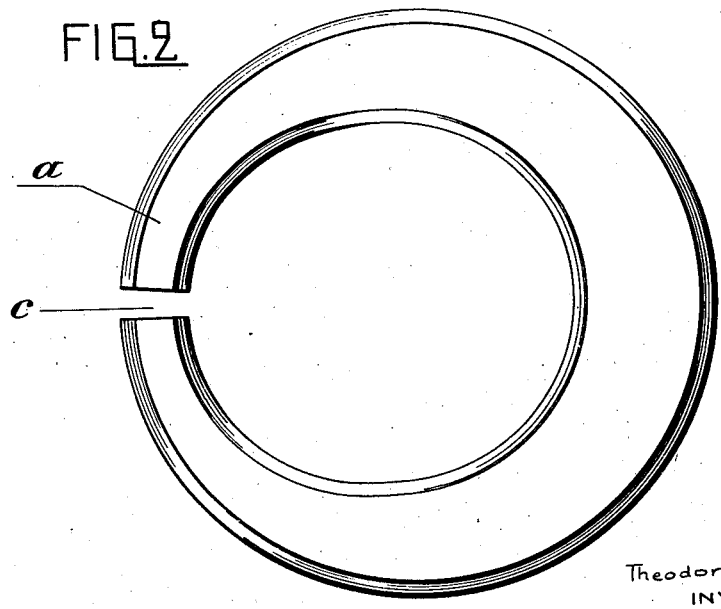
Theodor Held
INVENTOR;
By
his Attorney.

Patented July 28, 1931

1,816,325

UNITED STATES PATENT OFFICE

THEODOR HELD, OF UERDINGEN, GERMANY, ASSIGNOR TO THE FIRM "RINGFEDER" G. M. B. H., OF UERDINGEN, GERMANY

FRICTION SPRING

Application filed February 20, 1930, Serial No. 429,976, and in Germany February 25, 1929.

My invention relates to improvements in springs, and more specifically to so-called friction springs of that known type which is composed of alternate closed outer rings and split inner rings subject to bending stresses. The contacting surfaces of these rings are designed in such a way, for instance cone-shaped or concave-conical, that when the spring is axially loaded, the inner rings become reduced in diameter due to the wedge action between the rings. The bending moments acting on the split inner ring are at the gap or slit equal to zero and attain their maximum value diametrically opposite the said gap or slit. This fact is not taken into account in the construction of the hitherto employed friction springs of the present kind, inasmuch as the inner rings are made of a general uniform cross-section throughout. They thus lose under the action of the stresses more or less their circular shape, remain only partly in contact with the outer rings and cause in the outer rings high local bending stresses.

According to my invention, the cross-sections of the split inner ring are reduced in area towards the split of the ring in such a way that when the spring is axially loaded, the surface pressures at the bevelled contacting surfaces of the rings remain substantially equal along the entire circumference of the ring and the ring retains its circular shape. The dimensions of the individual cross-sections of the inner ring are determined according to the bending moment produced in the respective cross-section as a consequence of the radial forces uniformly distributed over the ring piece in question. In this respect, it is necessary that in each cross-section the product of the moment of resistance and the bending stress occurring in the specific cross section should be equal to the bending moment. Since according to the idea of my invention the ring should always remain circular, the value of the bending stress developing in the individual cross-sections depends upon the radially measured thickness of the cross-section so that it is possible to determine the dimensions of the ring accurately by computation.

An embodiment of my invention is by way of example illustrated in the drawings affixed to my specification. In the drawings the figures represent Fig. 1, a longitudinal section through a complete spring, and Fig. 2, a plan of an individual inner ring.

Referring to the drawings, $a$ are the split inner rings and $b$ the closed or continuous outer rings. As shown in the drawings, the cross-section of each split inner ring $a$ decreases from the point diametrically opposite to the split or gap $c$ towards the said split. It will be understood that the cross-section of the ring $a$ may have any other suitable shape or may change its shape within the ring without departing from the spirit of my invention or the ambit of the appended claims.

What I claim is:—

1. A friction spring composed of continuous outer rings and split inner rings subjected to bending stresses by said outer rings under axial load of the spring, said split inner rings diminishing in their cross-sections from a point diametrically opposite the split of the inner ring towards said split in such a way that under axial load of the spring the inner rings remain substantially circular under the action of radial forces uniformly distributed over the circumference of the ring.

2. A friction spring composed of continuous outer rings and split inner rings subjected to bending stresses by said outer rings under axial load of the spring, said split inner rings diminishing in the area and changing in the shape of their cross-sections from a point diametrically opposite the split of the inner ring towards the said split in such a manner that the rings remain substantially circular under the action of radial forces uniformly distributed over the circumference.

In testimony whereof I have affixed my signature.

THEODOR HELD.